(12) United States Patent
Nakagawa et al.

(10) Patent No.: US 10,723,176 B2
(45) Date of Patent: Jul. 28, 2020

(54) RUBBER COMPOSITION FOR SIDEWALLS, AND PNEUMATIC TIRE USING SAME

(71) Applicant: The Yokohama Rubber Co., LTD., Minato-ku, Tokyo (JP)

(72) Inventors: Ryutaro Nakagawa, Hiratsuka (JP); Yusuke Tanabe, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 218 days.

(21) Appl. No.: 15/556,285

(22) PCT Filed: Mar. 3, 2016

(86) PCT No.: PCT/JP2016/056604
§ 371 (c)(1),
(2) Date: Sep. 6, 2017

(87) PCT Pub. No.: WO2016/143662
PCT Pub. Date: Sep. 15, 2016

(65) Prior Publication Data
US 2018/0056718 A1    Mar. 1, 2018

(30) Foreign Application Priority Data
Mar. 6, 2015    (JP) .................................. 2015-045014

(51) Int. Cl.
*B60C 1/00*        (2006.01)
*C08K 3/04*        (2006.01)
(Continued)

(52) U.S. Cl.
CPC .............. *B60C 1/0025* (2013.01); *B60C 1/00* (2013.01); *C08K 3/04* (2013.01); *C08L 7/00* (2013.01);
(Continued)

(58) Field of Classification Search
CPC ........... B60C 1/0025; B60C 1/00; C08K 3/04; C08L 91/00; C08L 91/06; C08L 9/00; C08L 23/26; C08L 7/00
See application file for complete search history.

(56) References Cited

U.S. PATENT DOCUMENTS

2003/0125438 A1   7/2003   Graf et al.
2003/0130401 A1   7/2003   Lin et al.
(Continued)

FOREIGN PATENT DOCUMENTS

JP    H10-087900    4/1998
JP    2002-080836   3/2002
(Continued)

OTHER PUBLICATIONS

English Translation of JP 2002121326 (Year: 2002).*
International Search Report for International Application No. PCT/JP2016/056604 dated Apr. 5, 2016, 4 pages, Japan.

*Primary Examiner* — Peter F Godenschwager
*Assistant Examiner* — Andrew J. Oyer
(74) *Attorney, Agent, or Firm* — Thorpe North & Western

(57) ABSTRACT

The present technology provides a rubber composition for sidewalls containing, a diene rubber, from 10 to 120 parts by mass of a carbon black, and from 3 to 30 parts by mass of an acid-modified polyolefin having a melting point of from 100 to 150° C. per 100 parts by mass of the diene rubber, a main chain of the acid-modified polyolefin being a homopolymer of an olefin; and a pneumatic tire using the same in sidewalls thereof.

8 Claims, 1 Drawing Sheet

(51) Int. Cl.
*C08L 91/06* (2006.01)
*C08L 91/00* (2006.01)
*C08L 7/00* (2006.01)
*C08L 23/26* (2006.01)
*C08L 9/00* (2006.01)

(52) U.S. Cl.
CPC ............... *C08L 9/00* (2013.01); *C08L 23/26* (2013.01); *C08L 91/00* (2013.01); *C08L 91/06* (2013.01)

(56) References Cited

U.S. PATENT DOCUMENTS

| | | | | |
|---|---|---|---|---|
| 2004/0019135 | A1* | 1/2004 | Horiguchi | B60C 1/0016 524/47 |
| 2011/0269871 | A1* | 11/2011 | Kirino | B60C 1/0016 523/156 |
| 2013/0206301 | A1* | 8/2013 | Fudemoto | B60C 9/22 152/450 |

FOREIGN PATENT DOCUMENTS

| | | |
|---|---|---|
| JP | 2002-121326 | 4/2002 |
| JP | 2002121326 A * | 4/2002 |
| JP | 2005-112905 | 4/2005 |
| JP | 2011-153168 | 8/2011 |
| JP | 2012-216509 | 11/2012 |
| WO | WO 03/054054 | 7/2003 |

* cited by examiner

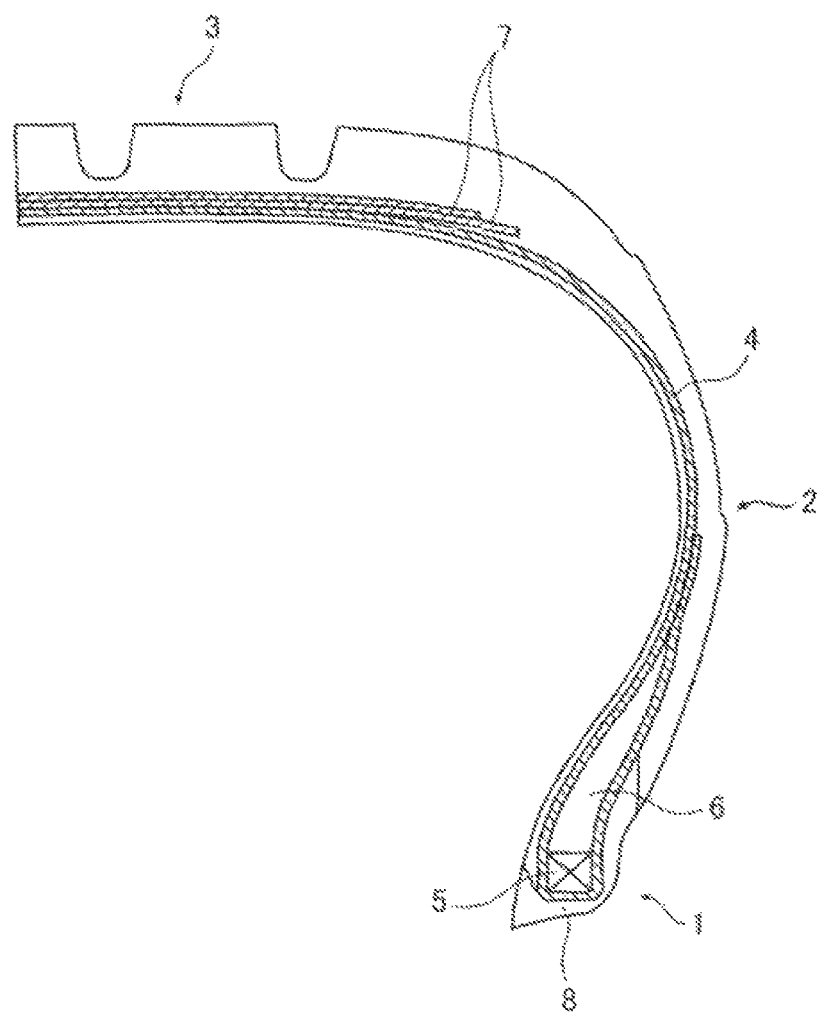

RUBBER COMPOSITION FOR SIDEWALLS, AND PNEUMATIC TIRE USING SAME

TECHNICAL FIELD

The present technology relates to a rubber composition for sidewalls and a pneumatic tire using the same.

BACKGROUND ART

Conventionally, rubber products such as tires, rubber hoses, industrial belts, vibration insulating rubbers, fenders, and shoe soles are produced using rubber compositions containing diene rubbers.

As an example of a rubber composition which may be used in such applications, a rubber composition formed by compounding from 1 to 50 parts by weight of a modified polymer, which is prepared by modifying a polyolefin resin with an unsaturated carboxylic acid, with 100 parts by weight of a diene rubber has been proposed (Japanese Unexamined Patent Application Publication No. 10-87900).

On the other hand, when a rubber composition is used for sidewalls, there is a demand for excellent ozone resistance. Therefore, natural rubbers and butadiene rubbers are typically used as rubber components in a rubber composition for sidewalls. However, when a natural rubber and a butadiene rubber are used in combination, there is a problem in that the tensile properties (modulus, elongation at break) are diminished in comparison to when only a natural rubber is used (Comparative Example 1).

Under such circumstances, when a rubber composition containing a diene rubber and an acid-modified polyolefin was prepared and evaluated using Japanese Unexamined Patent Application Publication No. 10-87900 as a reference, it is clear that there is room to improve the tensile properties in order to use a rubber obtained from such a rubber composition as a sidewall (Comparative Examples 5 and 4).

In addition, it is clear that there are cases in which the processability is diminished (Comparative Example 3) or the tensile properties are diminished (Comparative Example 2) in a rubber composition containing a diene rubber and a specific acid-modified polyolefin.

SUMMARY

The present technology provides a rubber composition for sidewalls which has excellent processability, and is capable of enhancing tensile properties while maintaining excellent ozone resistance.

As a result of conducting dedicated research in order to solve the problems described above, the present inventors discovered that a prescribed effect can be obtained by a rubber composition containing prescribed amounts of a carbon black and an acid-modified polyolefin having a melting point within a specific range and a specific main chain with respect to a diene rubber, and the present inventors thereby completed the present technology.

The present technology is based on the knowledge and the like described above. Specifically, the present technology solves the problems described above with the following configurations.

1. A rubber composition for sidewalls containing a diene rubber, from 10 to 120 parts by mass of a carbon black, and from 3 to 30 parts by mass of an acid-modified polyolefin having a melting point of from 100 to 150° C. per 100 parts by mass of a diene rubber, a main chain of the acid-modified polyolefin being a homopolymer of an olefin.

2. The rubber composition for sidewalls according to 1 above, wherein the diene rubber contains at least a natural rubber and a butadiene rubber, and a content of the butadiene rubber is not less than 30 parts by mass per 100 parts by mass of the diene rubber.

3. The rubber composition for sidewalls according to 1 or 2 above, wherein a main chain of the acid-modified polyolefin is a polyethylene, polypropylene, or polybutene.

4. The rubber composition for sidewalls according to any one of 1 to 3 above, wherein the acid-modified polyolefin is a polyolefin modified with a carboxylic acid or an acid anhydride.

5. The rubber composition for sidewalls according to any one of 1 to 4 above, wherein a melt mass flow rate of the acid-modified polyolefin at 190° C. is from 1.0 to 8.0 g/10 min.

6. A pneumatic tire using the rubber composition for sidewalls according to any one of 1 to 5 above as a sidewall.

The rubber composition for sidewalls of the present technology and the pneumatic tire of the present technology have excellent processability, and are capable of enhancing tensile properties while maintaining excellent ozone resistance.

BRIEF DESCRIPTION OF DRAWING

FIG. 1 is a partial cross-sectional schematic view of a tire that illustrates one embodiment of a pneumatic tire of the present technology.

DETAILED DESCRIPTION

Embodiments of the present technology are described in detail below.

Note that, in the present specification, numerical ranges indicated using "(from) . . . to . . . " include the former number as the lower limit value and the later number as the upper limit value.

In addition, when a component contains two or more types of substances in the present specification, the content of the component refers to the total content of the two or more types of substances.

Rubber Composition

The rubber composition for sidewalls of the present technology (rubber composition of the present technology) contains from 10 to 120 parts by mass of a carbon black and from 3 to 30 parts by mass of an acid-modified polyolefin having a melting point of from 100 to 150° C. per 100 parts by mass of a diene rubber, the main chain of the acid-modified polyolefin being a homopolymer of an olefin.

The rubber composition of the present technology is thought to achieve desired effects as a result of having such a configuration. Although the reason for this is unknown, the processability and tensile properties are presumed to be roughly as follows.

The melting point of the acid-modified polyolefin contained in the rubber composition of the present technology is from 100 to 150° C., and the main chain (polyolefin) is a homopolymer, so the compatibility of the acid-modified polyolefin with the diene rubber is enhanced so that it can be dispersed uniformly, which is thought to yield excellent processability and to make it possible to enhance the tensile properties.

Each of the components contained in the rubber composition of the present technology will be described in detail below.

Diene Rubber

The diene rubber contained in the rubber composition of the present technology is not particularly limited as long as the rubber has double bonds in the main chain. Examples of diene rubbers include natural rubber (NR), isoprene rubber (IR), butadiene rubber (BR), aromatic vinyl-conjugated diene copolymer rubber, chloroprene rubber (CR), acrylonitrile butadiene rubber (NBR), ethylene-propylene-diene copolymer rubber (EPDM), styrene-isoprene rubber, isoprene-butadiene rubber, nitrile rubber, and hydrogenated nitrile rubber.

A single diene rubber can be used, or a combination of two or more types can be used.

Of these, NR or BR is preferable, and NR and BR are particularly preferable as diene rubbers.

The weight average molecular weight of the diene rubber is not particularly limited but is preferably from 50000 to 3000000 and more preferably from 100000 to 2000000. Note that the weight average molecular weight (Mw) of the diene rubber is a value determined on the basis of polystyrene standard based on a measurement determined by gel permeation chromatography (GPC) using tetrahydrofuran as a solvent.

When the diene rubber contains at least one type selected from the group consisting of NR and BR, the content of the at least one type selected from the group consisting of NR and BR (when the diene rubber contains NR and BR, this is the total content of both rubbers) is preferably from 10 to 100 mass % with respect to the diene rubber.

When the diene rubber contains NR and BR, the BR content is preferably not less than 30 parts by mass and more preferably from 30 to 70 parts by mass per 100 parts by mass of the diene rubber in that at least one of the maintenance of ozone resistance, the enhancement of processability, and tensile properties is superior (this is also described as ensuring a superior effect of the present technology hereafter).

Acid-Modified Polyolefin

The acid-modified polyolefin contained in the rubber composition of the present technology has a homopolymer of an olefin as a main chain, is modified with an acid, and has a melting point of from 100 to 150° C.

Main Chain

The main chain of the acid-modified polyolefin is a homopolymer of an olefin.

Examples of the olefin constituting the main chain of the acid-modified polyolefin include ethylene and α-olefins. Examples of α-olefins include propylene, 1-butene, and 1-octene.

Examples of homopolymers of olefins which can serve as the main chain of the acid-modified polyolefin include polyethylene, polypropylene, polybutene, and polyoctene. Of these, polypropylene, polyethylene, and polybutene are preferable.

Examples of polyethylenes include polyethylenes having a low to high density. Of these, a high-density polyethylene is preferable. When the main chain of the acid-modified polyolefin is a high-density polyethylene, the density of such an acid-modified polyolefin is preferably from 940 to 980 kg/m$^3$. Note that in the present technology, the density of the acid-modified polyolefin is measured in accordance with ASTM D1505.

Carboxylic Acid

On the other hand, the acid used to modify the main chain described above is not particularly limited. Examples thereof include carboxylic acids and acid anhydrides.

Examples of carboxylic acids include formic acid; saturated hydrocarbon-based carboxylic acids such as acetic acid; and unsaturated carboxylic acids.

Examples of acid anhydrides include anhydrides of the carboxylic acids described above.

An unsaturated carboxylic acid or an acid anhydride thereof is one preferable mode of the acid.

An example of the unsaturated carboxylic acid is a compound having a carboxy group and an aliphatic hydrocarbon group having an unsaturated bond. One preferred mode of an unsaturated bond is a double bond. The aliphatic hydrocarbon group is not particularly limited. The aliphatic hydrocarbon group and the carboxy group can be bonded directly, for example.

Examples of the unsaturated carboxylic acids include monocarboxylic acids such as acrylic acids and methacrylic acids; dicarboxylic acids such as maleic acid, fumaric acid, crotonic acid, and itaconic acid; and acid anhydrides thereof.

Of these, maleic anhydride, maleic acid, and acrylic acids are preferable.

The acid-modified polyolefin is preferably a polyolefin modified with an acid anhydride and more preferably a polyolefin modified with maleic anhydride.

In the acid-modified polyolefin, the position at which the carboxylic acid bonds to the main chain is not particularly limited. Examples thereof include a terminal or a side chain. Of these, the carboxylic acid preferably bonds to the main chain as a side chain. The carboxylic acid and the main chain may bond directly or via an organic group. The organic group is not particularly limited.

In the present technology, the melting point of the acid-modified polyolefin is preferably from 100 to 150° C. Since the melting point of the acid-modified polyolefin is not lower than 100° C., the state of the acid-modified polyolefin used in the present technology is a solid at room temperature (23° C.).

The melting point of the acid-modified polyolefin is preferably from 105 to 148° C. and more preferably from 110 to 146° C. from the perspective of ensuring a superior effect of the present technology.

In the present technology, the melting point of the acid-modified polyolefin is measured in accordance with ASTM D2117.

The melt mass flow rate (MFR) of the acid-modified polyolefin at 190° C. is preferably from 1.0 to 8.0 g/10 min and more preferably from 1.2 to 7.8 g/10 min from the perspective of ensuring a superior effect of the present technology.

In the present technology, the MFR of the acid-modified polyolefin is measured under conditions at 190° C. and a load of 2.16 kgf in accordance with ASTM D1238.

The production of the acid-modified polyolefin is not particularly limited. Examples thereof include conventionally known methods. One preferred mode is a production method using graft polymerization.

Furthermore, a commercially available product may be used as the acid-modified polyolefin.

Examples of commercially available products include maleic anhydride-modified polypropylenes such as Admer QE060 (manufactured by Mitsui Chemicals, Inc.); and maleic anhydride-modified high-density polyethylenes such as Admer HE810 (manufactured by Mitsui Chemicals, Inc.).

A single acid-modified polyolefin may be used alone, or a combination of two or more acid-modified polyolefins may be used.

In the present technology, the content of the acid-modified polyolefin is from 3 to 30 parts by mass, preferably from 4 to 27 parts by mass, and more preferably from 5 to 25 parts by mass per 100 parts by mass of the diene rubber.

Carbon Black

The carbon black contained in the rubber composition of the present technology is not particularly limited. Examples thereof are the same carbon blacks that may be typically used in rubber compositions. Specific examples include SAF (Super Abrasion Furnace), ISAF (Intermediate Super Abrasion Furnace), IISAF, N339, HAF (High Abrasion Furnace), FEF (Fast Extrusion Furnace), GPF (General Purpose Furnace), and SRF (Semi-Reinforcing Furnace). Of these, SAF, ISAF, IISAF, N399, HAF, and FEF are preferable.

The nitrogen adsorption specific surface area ($N_2SA$) of the carbon black described above is preferably from 30 to 250 $m^2/g$ and more preferably from 40 to 240 $m^2/g$ from the perspective of ensuring a superior effect of the present technology.

Note that the $N_2SA$ is a value of the amount of nitrogen adsorbed to the surface of carbon black, measured in accordance with JIS (Japanese Industrial Standard) K6217-2: 2001, "Part 2: Determination of specific surface area—Nitrogen adsorption methods—Single-point procedures".

The carbon black may be used alone, or a combination of two or more types of carbon blacks may be used.

The content of the carbon black is from 10 to 120 parts by mass, preferably from 20 to 100 parts by mass, and more preferably from 30 to 80 parts by mass, per 100 parts by mass of the diene rubber.

Other Components

The rubber composition of the present technology may further contain other components (additives) as necessary in a range that does not inhibit the object or effect of the present technology. Examples of other components include components which may be typically compounded with rubber compositions such as fillers other than carbon black (for example, silica), acid-modified polyolefins other than those described above, vulcanizing agents, crosslinking agents, vulcanization accelerators, vulcanization accelerator aids such as zinc oxide or stearic acid, vulcanization retarders, oils, anti-aging agents, plasticizers, and silane coupling agents. The content of the other components may be selected appropriately.

One preferred aspect of the rubber composition of the present technology is a rubber composition which substantially contains no regenerated polyethylene terephthalate. An example of regenerated polyethylene terephthalate is a powder prepared by micronizing a molded product made of unused or used polyethylene terephthalate. The phrase "substantially contains no regenerated polyethylene terephthalate" means that the content of regenerated polyethylene terephthalate is from 0 to 0.1 parts by mass per 100 parts by mass of the entire rubber composition of the present technology. The content of regenerated polyethylene terephthalate is preferably 0 parts by mass with respect to the entire rubber composition of the present technology.

An example of the production method of the rubber composition of the present technology is a method of mixing the components described above.

A preferred aspect is one in which the temperature at the time of mixing is higher than or equal to the melting point of the acid-modified polyolefin. For example, the temperature may be set to 100 to 170° C.

The aforementioned additives that may be used as necessary may be further added to the components described above.

In addition, components other than vulcanization components such as vulcanizing agents and vulcanization accelerators may be mixed in advance, and the vulcanization components may be added thereto. At this time, when mixing in advance or mixing after the vulcanization components are added, the components may be mixed at a temperature higher than or equal to the melting point of the acid-modified polyolefin.

The device used to mix the components described above is not particularly limited. Examples thereof include conventionally known devices.

In the present specification, mixing includes kneading.

The rubber composition of the present technology can be vulcanized or crosslinked under conventional, publicly known vulcanizing or crosslinking conditions, for example.

The rubber composition of the present technology can be used as the rubber composition constituting a sidewall when manufacturing a pneumatic tire, for example.

Pneumatic Tire

The pneumatic tire of the present technology is a pneumatic tire that uses the rubber composition of the present technology described above in the sidewalls thereof.

FIG. 1 is a partial cross-sectional schematic view of a tire that illustrates one embodiment of the pneumatic tire of the present technology, but the pneumatic tire of the present technology is not limited to the attached drawing.

In FIG. 1, reference sign 1 denotes a bead portion, reference sign 2 denotes a sidewall, and reference sign 3 denotes a tire tread portion. A carcass layer 4, in which fiber cords are embedded, is mounted between a left-right pair of the bead portions 1, and ends of the carcass layer 4 are turned up around bead cores 5 and bead fillers 6 from an inner side to an outer side of the tire. In the tire tread portion 3, a belt layer 7 is provided along the entire periphery of the tire on the outer side of the carcass layer 4. Rim cushions 8 are provided in parts of the bead portions 1 that are in contact with a rim (not illustrated).

In the pneumatic tire of the present technology, the sidewalls are formed from the rubber composition of the present technology.

The pneumatic tire of the present technology can be produced, for example, in accordance with a conventionally known method. In addition to ordinary air or air with an adjusted oxygen partial pressure, inert gases such as nitrogen, argon, and helium can be used as the gas with which the tire is filled.

Examples

The present technology is described below in detail using examples, but the present technology is not limited to such examples.

Production of the Rubber Composition

Each component shown in Table 1 below was used with the compositions (parts by mass) shown in the table.

First, each of the components shown in Table 1 below, excluding the vulcanization components (sulfur, sulfur-containing vulcanization accelerator), was heated from 50° C. to 170° C. and kneaded for approximately 4 minutes under conditions in this temperature range with a tangential-type mixer to obtain a mixture. The vulcanization components described above were added to the mixture obtained as described above, and these were kneaded under conditions at 10 to 100° C. with an open roll to produce a rubber sheet.

Evaluation of the processability of the rubber composition

The processability of the rubber composition was evaluated based on the wrapping around the open roll and the finished state of the rubber sheet. The results are shown in Table 1.

Cases in which the rubber composition exhibited excellent wrapping around the open roll and there was no roughness or edge breakage in the rubber sheet produced as described above were evaluated as having excellent processability, and such cases are denoted as "A".

Cases in which the rubber composition exhibited poor wrapping around the open roll and there was some roughness or edge breakage in the rubber sheet produced as described above were evaluated as having low processability, and such cases are denoted as "B".

Production of Vulcanized Rubber

The rubber sheet produced as described above was press-vulcanized for 15 minutes at 160° C. in a prescribed mold to obtain a vulcanized rubber test piece.

Evaluation

The tensile properties (tensile stress (M100), elongation at break ($E_b$)) and ozone resistance were evaluated by the test methods described below using the vulcanized rubber test piece obtained as described above. The results of the M100 and elongation at break of each example are shown in Table 1 as an index value using the result of a standard example as an index value of 100. Measurement of tensile stress (M100) and elongation at break ($E_b$)

A JIS No. 3 dumbbell-shaped test piece was punched out from the vulcanized rubber test piece obtained as described above, and a tensile test was performed at a tensile rate 500 mm/min in accordance with JIS K6251:2010 to measure the tensile stress at 100% elongation (M100) and elongation at break ($E_b$) under conditions at 20° C. or 100° C.

A larger index value of M100 indicates that there is hardness.

A larger index value of elongation at break indicates that the rubber stretches.

When the index values of M100 and elongation at break are large, the composition exhibits excellent tensile properties.

Measurement of Tan δ (60° C.)

The value of tan δ (60° C.) of the vulcanized rubber test piece obtained as described above was measured using a viscoelastic spectrometer manufactured by Iwamoto Seisakusho at an elongation deformation distortion factor of 10±2%, a vibration frequency of 20 Hz, and a temperature of 60° C.

Smaller index values indicate superior low heat build-up.

Ozone Resistance

A test piece was produced in accordance with JIS K6251 from the vulcanized rubber test piece obtained as described above. An ozone resistance test was performed using the test piece produced in this way at 20% elongation, an ozone concentration of 50 pphm, and a temperature of 40° C. in accordance with JIS K6259:2004 and the test piece after the ozone resistance test was visually observed.

Cases in which there were no scratches on the test piece after the ozone resistance test were evaluated as having excellent ozone resistance, and such cases are denoted as "A".

Cases in which there were scratches on the test piece after the ozone resistance test were evaluated as having poor ozone resistance, and such cases are denoted as "B".

TABLE 1

| Composition components/ compounded amounts (parts by mass) | Standard Example | Comparative Example 1 | 2 | 3 | 4 | 5 | Examples 1 | 2 | 3 | 4 | 5 |
|---|---|---|---|---|---|---|---|---|---|---|---|
| NR | 100 | 40 | 40 | 40 | 40 | 40 | 40 | 40 | 40 | 40 | 40 |
| BR | | 60 | 60 | 60 | 60 | 60 | 60 | 60 | 60 | 60 | 60 |
| Acid-modified polyolefin 1 | | | 1 | 40 | | | 5 | 15 | 30 | | |
| Acid-modified polyolefin 2 | | | | | | | | | | 15 | |
| (Comparison) Acid-modified polyolefin 3 (main chain: copolymer) | | | | | 15 | | | | | | |
| (Comparison) Acid-modified polyolefin 4 (melting point: lower than 100° C.) | | | | | | 15 | | | | | |
| Acid-modified polyolefin 5 | | | | | | | | | | | 15 |
| Carbon black | 50 | 50 | 50 | 50 | 50 | 50 | 50 | 50 | 50 | 50 | 50 |
| Zinc oxide | 3 | 3 | 3 | 3 | 3 | 3 | 3 | 3 | 3 | 3 | 3 |
| Stearic acid | 1.5 | 1.5 | 1.5 | 1.5 | 1.5 | 1.5 | 1.5 | 1.5 | 1.5 | 1.5 | 1.5 |
| Anti-aging agent (S-13) | 3.25 | 3.25 | 3.25 | 3.25 | 3.25 | 3.25 | 3.25 | 3.25 | 3.25 | 3.25 | 3.25 |
| Wax | 1 | 1 | 1 | 1 | 1 | 1 | 1 | 1 | 1 | 1 | 1 |
| Oil | 12 | 12 | 12 | 12 | 12 | 12 | 12 | 12 | 12 | 12 | 12 |
| Sulfur | 1.54 | 1.54 | 1.54 | 1.54 | 1.54 | 1.54 | 1.54 | 1.54 | 1.54 | 1.54 | 1.54 |
| Sulfur-containing vulcanization accelerator (CZ) | 0.8 | 0.8 | 0.8 | 0.8 | 0.8 | 0.8 | 0.8 | 0.8 | 0.8 | 0.8 | 0.8 |
| Processability | A | A | A | B | A | A | A | A | A | A | A |
| M100 @ 20° C. | 100 | 89 | 90 | — | 134 | 133 | 123 | 162 | 272 | 150 | 135 |
| Elongation @ at break 20° C. | 100 | 96 | 95 | — | 87 | 99 | 101 | 101 | 101 | 102 | 101 |
| M100 @ 100° C. | 100 | 94 | 96 | — | 136 | 86 | 137 | 148 | 173 | 142 | 139 |
| Elongation at break @ 100° C. | 100 | 98 | 98 | — | 90 | 98 | 101 | 102 | 110 | 112 | 103 |
| Tan δ (60° C.) | 100 | 101 | 100 | — | 101 | 100 | 97 | 100 | 101 | 100 | 100 |
| Ozone resistance | B | A | A | — | A | A | A | A | A | A | A |

The details of each component shown in Table 1 above are as follows.

NR: Natural rubber, NUSIRA SIR20

BR: Butadiene rubber; Nipol BR1220, manufactured by Zeon Corporation; weight average molecular weight: 400000

Acid-modified polyolefin 1: Maleic anhydride-modified high-density polyethylene polymer. The main chain is a homopolymer of ethylene (high-density polyethylene) and is modified with maleic anhydride. The maleic anhydride bonds to the main chain as a side chain. Melting point: 130° C.; density: 960 kg/m$^3$; MFR (190° C.)=1.7 g/10 min; Admer HE810 manufactured by Mitsui Chemicals, Inc.

Acid-modified polyolefin 2: Maleic anhydride-modified polypropylene polymer. The main chain is a homopolymer of propylene and is modified with maleic anhydride. The maleic anhydride bonds to the main chain as a side chain. Melting point: 140° C.; MFR (190° C.)=7.0 g/10 min; Admer QE060 manufactured by Mitsui Chemicals, Inc.

(Comparison) Acid-modified polyolefin 3: Maleic anhydride-modified ethylene/propylene copolymer. The main chain is a copolymer of ethylene and propylene and is modified with maleic anhydride. Melting point: 120° C.; MFR (190° C.)=0.4 g/10 min; Admer NE065 manufactured by Mitsui Chemicals, Inc.

(Comparison) Acid-modified polyolefin 4: Maleic anhydride-modified low-density polyethylene polymer. The main chain is a homopolymer of ethylene (low-density polyethylene) and is modified with maleic anhydride. The maleic anhydride bonds to the main chain as a side chain. Melting point: 95° C.; MFR (190° C.)=9.0 g/10 min; Admer NS101 manufactured by Mitsui Chemicals, Inc.

Acid-modified polyolefin 5: Maleic anhydride-modified low-density polyethylene polymer. The main chain is a homopolymer of ethylene (low-density polyethylene) and is modified with maleic anhydride. The maleic anhydride bonds to the main chain as a side chain. Melting point: 110° C.; MFR (190° C.)=1.0 g/10 min; Modic L502 manufactured by Mitsubishi Chemical Corporation Carbon black: Shoblack N550, manufactured by Showa Cabot K.K.; N2SA: 42 m$^2$/g, FEF Zinc oxide: Zinc Oxide III, manufactured by Seido Chemical Industry Co., Ltd.

Stearic acid: stearic acid, manufactured by Nippon Oil & Fats Co., Ltd.

Anti-aging agent (S-13): Antigen 6C, manufactured by Sumitomo Chemical Co., Ltd.

Wax: SANNOC, manufactured by Ouchi Shinko Chemical Industrial

Oil: Extract No. 4S, manufactured by Showa Shell Sekiyu K.K.

Sulfur: oil-treated sulfur, manufactured by Karuizawa Refinery Ltd.

Sulfur-containing vulcanization accelerator (CZ): N-cyclohexyl-2-benzothiazolyl sulfenamide; Sanceller CM-PO, manufactured by Sanshin Chemical Industry Co., Ltd.

From the results shown in Table 1, in Comparative Example 1, in which a natural rubber and a butadiene rubber were used in combination and an acid-modified polyolefin was not contained, although the ozone resistance was better than in the standard example, the tensile properties were lower than in the standard example.

In Comparative Example 5, in which the melting point of the acid-modified polyolefin was outside the prescribed range, the tensile properties were sometimes lower than in the standard example.

In Comparative Example 4, in which the main chain of the acid-modified polyolefin was a copolymer, the tensile properties were sometimes lower than in the standard example.

In Comparative Example 2, in which the content of the acid-modified polyolefin deviated from the prescribed range, the tensile properties were lower than in the standard example. In addition, Comparative Example 3 exhibited poor processability.

In contrast, in Examples 1 to 5, it was possible to enhance the tensile properties beyond those of the standard example while maintaining excellent ozone resistance equivalent to that of Comparative Example 1, and the processability was superior to that of Comparative Example 3.

In a comparison of Examples 1 to 5 and Comparative Example 1 with regard to the tensile properties under conditions at 20° C. and 100° C., Examples 1 to 5 exhibited higher tensile properties than the standard example under conditions at 20° C. and 100° C. It is clear from this result that the rubber composition of the present technology has excellent tensile properties under conditions over a wide temperature range from low temperatures to high temperatures.

In addition, in a comparison of Examples 1 to 3 with regard to modulus, it was determined that the modulus increases as the content of the acid-modified polyolefin increases. Further, it is clear that low heat build-up is superior when the content of the acid-modified polyolefin is lower.

In a comparison of Example 2 and Example 5 with regard to the melting point of the acid-modified polyolefin, it can be seen that the modulus is higher when the melting point of the acid-modified polyolefin is higher.

In addition, it can be seen from the results of the examples that the rubber composition of the present technology makes it possible to maintain low heat build-up at a high level or exhibits superior low heat build-up.

The invention claimed is:

1. A rubber composition for sidewalls comprising:
   a diene rubber containing natural rubber and butadiene rubber, a content of the butadiene rubber being not less than 30 parts by mass per 100 parts by mass of the diene rubber and a total content of both of the natural rubber and the butadiene rubber being greater than 50 mass % of the diene rubber;
   from 10 to 120 parts by mass of a carbon black; and
   from 3 to 30 parts by mass of an acid-modified polyolefin having a melting point of from 100 to 150° C. per 100 parts by mass of the diene rubber, a main chain of the acid-modified polyolefin being a homopolymer of an olefin.

2. The rubber composition for sidewalls according to claim 1, wherein a main chain of the acid-modified polyolefin is a polyethylene, polypropylene, or polybutene.

3. The rubber composition for sidewalls according to claim 1, wherein the acid-modified polyolefin is a polyolefin modified with a carboxylic acid or an acid anhydride.

4. The rubber composition for sidewalls according to claim 1, wherein a melt mass flow rate of the acid-modified polyolefin at 190° C. is from 1.0 to 8.0 g/10 min.

5. A pneumatic tire using the rubber composition for sidewalls according to claim 1 as a sidewall.

6. The rubber composition for sidewalls according to claim 2, wherein the acid-modified polyolefin is a polyolefin modified with a carboxylic acid or an acid anhydride.

7. The rubber composition for sidewalls according to claim 6, wherein a melt mass flow rate of the acid-modified polyolefin at 190° C. is from 1.0 to 8.0 g/10 min.

8. A pneumatic tire using the rubber composition for sidewalls according to claim 7 as a sidewall.

* * * * *